United States Patent
Chu et al.

(10) Patent No.: US 10,969,619 B2
(45) Date of Patent: Apr. 6, 2021

(54) DISPLAY DEVICE

(71) Applicant: Samsung Display Co., Ltd., Yongin-si (KR)

(72) Inventors: Seung-jin Chu, Cheonan-si (KR); Wontae Kim, Suwon-si (KR); Yeogeon Yoon, Suwon-si (KR); Hee-keun Lee, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/367,053

(22) Filed: Mar. 27, 2019

(65) Prior Publication Data

US 2019/0391444 A1 Dec. 26, 2019

(30) Foreign Application Priority Data

Jun. 20, 2018 (KR) .................. 10-2018-0070998

(51) Int. Cl.
*G02F 1/1335* (2006.01)
*G02F 1/1339* (2006.01)
(Continued)

(52) U.S. Cl.
CPC .... *G02F 1/133514* (2013.01); *G02F 1/13394* (2013.01); *G02F 1/133512* (2013.01); *G02F 1/133528* (2013.01); *G02F 1/133617* (2013.01); *G02F 2001/13398* (2013.01); *G02F 2001/133357* (2013.01);
(Continued)

(58) Field of Classification Search
CPC ......... G02F 1/133514; G02F 1/133617; G02F 2001/133614; G02B 5/22; G02B 5/23; G02B 5/284; G02B 5/286; F21V 9/30; F21V 9/32
See application file for complete search history.

(56) References Cited

U.S. PATENT DOCUMENTS 9,917,235 B2   3/2018 Kim
2010/0182552 A1* 7/2010 Park ................... H01L 51/5281
                                                    349/114
(Continued)

FOREIGN PATENT DOCUMENTS

CN    108205217 A     6/2018
KR   10-2014-0119912 A   10/2014
(Continued)

*Primary Examiner* — Angela K Davison
(74) *Attorney, Agent, or Firm* — Innovation Counsel LLP

(57) ABSTRACT

A display device includes a display panel, a color conversion layer disposed on the display panel, and an adhesion member between the display panel and the color conversion layer. The color conversion layer includes a first conversion part configured to one of transmit a first color light and absorb first color light to emit second color light, a second conversion part configured to absorb the first color light to emit third color light, and a third conversion part configured to absorb the first color light to emit fourth color light, the first conversion part, the second conversion part, and the third conversion part are sequentially arranged in a first direction, the adhesion member is disposed on a bottom surface and a side surface of the first conversion part and attached to the display panel, and an air layer is defined between the display panel and the second and third conversion parts.

20 Claims, 12 Drawing Sheets

(51) Int. Cl.
*G02F 1/13357* (2006.01)
*G02F 1/1333* (2006.01)

(52) U.S. Cl.
CPC ............ *G02F 2001/133531* (2013.01); *G02F 2201/121* (2013.01); *G02F 2201/123* (2013.01)

(56) References Cited

U.S. PATENT DOCUMENTS

| | | | |
|---|---|---|---|
| 2014/0368766 A1* | 12/2014 | Shibata | G02F 1/133617 349/61 |
| 2015/0286098 A1* | 10/2015 | Lee | F21V 9/30 349/71 |
| 2017/0205666 A1 | 7/2017 | Suh | |
| 2018/0012909 A1 | 1/2018 | Kim et al. | |
| 2018/0019238 A1 | 1/2018 | Kim et al. | |
| 2018/0156951 A1 | 6/2018 | Baek et al. | |
| 2018/0173053 A1 | 6/2018 | Yoon et al. | |
| 2018/0231830 A1* | 8/2018 | Wu | G02F 1/133617 |
| 2018/0356688 A1* | 12/2018 | Chen | G02F 1/133617 |

FOREIGN PATENT DOCUMENTS

| | | |
|---|---|---|
| KR | 10-2017-0087091 A | 7/2017 |
| KR | 10-2017-0116633 A | 10/2017 |
| KR | 10-2018-0007028 A | 1/2018 |
| KR | 10-2018-0046969 A | 5/2018 |

* cited by examiner

DISPLAY DEVICE

CROSS-REFERENCE TO RELATED APPLICATIONS

This U.S. patent application claims priority to and the benefit of Korean Patent Application No. 10-2018-0070998, filed on Jun. 20, 2018, the entire contents of which are hereby incorporated by reference.

BACKGROUND

Various display devices used for multimedia devices such as a television, a mobile phone, a tablet computer, a navigation unit, and a game console are being developed. In recent years, a photo-luminescent liquid crystal display (LCD) and a photo-luminescent organic electroluminescence display (OLED), which have better light utilization efficiency and improved color balance, are being developed.

Various display devices are limited by a color conversion layer, in which light is reflected downward and outputted to the outside. Various trials have been carried out to resolve the above limitation, and a method of improving light utilization efficiency by providing a low refractive organic layer has been used.

SUMMARY

The present disclosure provides a display panel and a display device, which have an improved light output efficiency and provide a screen with improved brightness.

An embodiment of the inventive concept provides a display device including a display panel, a color conversion layer, and an adhesion member.

The color conversion layer is disposed on the display panel, and the adhesion member is disposed between the display panel and the color conversion layer. The color conversion layer includes a first conversion part configured to one of transmit a first color light and absorb first color light to emit second color light, a second conversion part configured to absorb the first color light to emit third color light, and a third conversion part configured to absorb the first color light to emit fourth color light, the first conversion part, the second conversion part, and the third conversion part are sequentially arranged in a first direction, the adhesion member is disposed on a bottom surface and a side surface of the first conversion part and attached to the display panel, and an air layer is defined between the display panel and the second and third conversion parts.

In an embodiment, the adhesion member may include: a first adhesion part disposed on the bottom surface of the first conversion part; a second adhesion part disposed on a first side surface of the first conversion part; and a third adhesion part disposed on a second side surface of the first conversion part.

In an embodiment, the adhesion member may be spaced apart from the second conversion part and the third conversion part on a plane.

In an embodiment, the adhesion member may be spaced apart from a bottom surface of the second conversion part and a bottom surface of the third conversion part, and the bottom surface of the second conversion part and the bottom surface of the third conversion part may be exposed to the air layer.

In an embodiment, a sum of a height of the first conversion part and a height of the first adhesion part may be greater than each of a height of the second conversion part and a height of the third conversion part.

In an embodiment, the first conversion part may have a height greater than each of a height of the second conversion part and a height of the third conversion part.

In an embodiment, the first conversion part may have a height equal to each of a height of the second conversion part and a height of the third conversion part.

In an embodiment, the first conversion part may have a height less than each of a height of the second conversion part and a height of the third conversion part.

In an embodiment, the air layer may have a height greater than 0 μm and equal to or less than 3 μm.

In an embodiment, the first color light may have a first blue color having a first central wavelength, the second color light may have a second blue color having a second central wavelength that is different from the first central wavelength, and one of the third color light and the fourth color light may have a red color, and the other may have a green color.

In an embodiment, the display device may further include a first color blocking filter disposed on the color conversion layer, and the first color blocking filter may not overlap the first conversion part and may overlap at least one of the second conversion part and the third conversion part.

In an embodiment, the display device may further include at least one of a first color filter, a second color filter, and a third color filter, which are disposed on the color conversion layer. The first color filter may overlap the first color conversion part on a plane, the second color filter may overlap the second color conversion part on the plane, and the third color filter may overlap the third color conversion part on the plane.

In an embodiment, the display panel may include: a first electrode; a hole transport region disposed on the first electrode; a light emitting layer disposed on the hole transport region to emit the first color light; an electron transport region disposed on the light emitting layer; and a second electrode disposed on the electron transport region.

In an embodiment, the display panel may include: a light source unit configured to provide the first color light; a first substrate disposed on the light source unit; a second substrate disposed on the first substrate; and a liquid crystal layer disposed between the first substrate and the second substrate.

In an embodiment, the first substrate may include: a base substrate; a transistor disposed on the base substrate; a planarization layer disposed on the transistor; a passivation layer disposed on the planarization layer; a pixel electrode disposed on the passivation layer; and a first in-cell polarizing layer disposed between the planarization layer and the liquid crystal layer.

In an embodiment, the first in-cell polarizing layer may be disposed between the planarization layer and the passivation layer, and contact a data electrode through a first contact hole defined in the planarization layer, and the pixel electrode may contact the first in-cell polarizing layer through a second contact hole defined in the passivation layer.

In an embodiment, the display panel may further include a light shielding column spacer disposed on the pixel electrode and overlapping the transistor on a plane.

In an embodiment, the light shielding column spacer may include: a first column spacer disposed on the pixel electrode; and a second column spacer disposed on the first column spacer, the first column spacer may have a width greater than that of the second column spacer, and the first column spacer may have a red color.

In an embodiment, the second substrate may include: a common electrode; and a second in-cell polarizing layer disposed on the common electrode.

In an embodiment, the second in-cell polarizing layer may be disposed on a glass substrate, and the glass substrate may be disposed on the common electrode.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
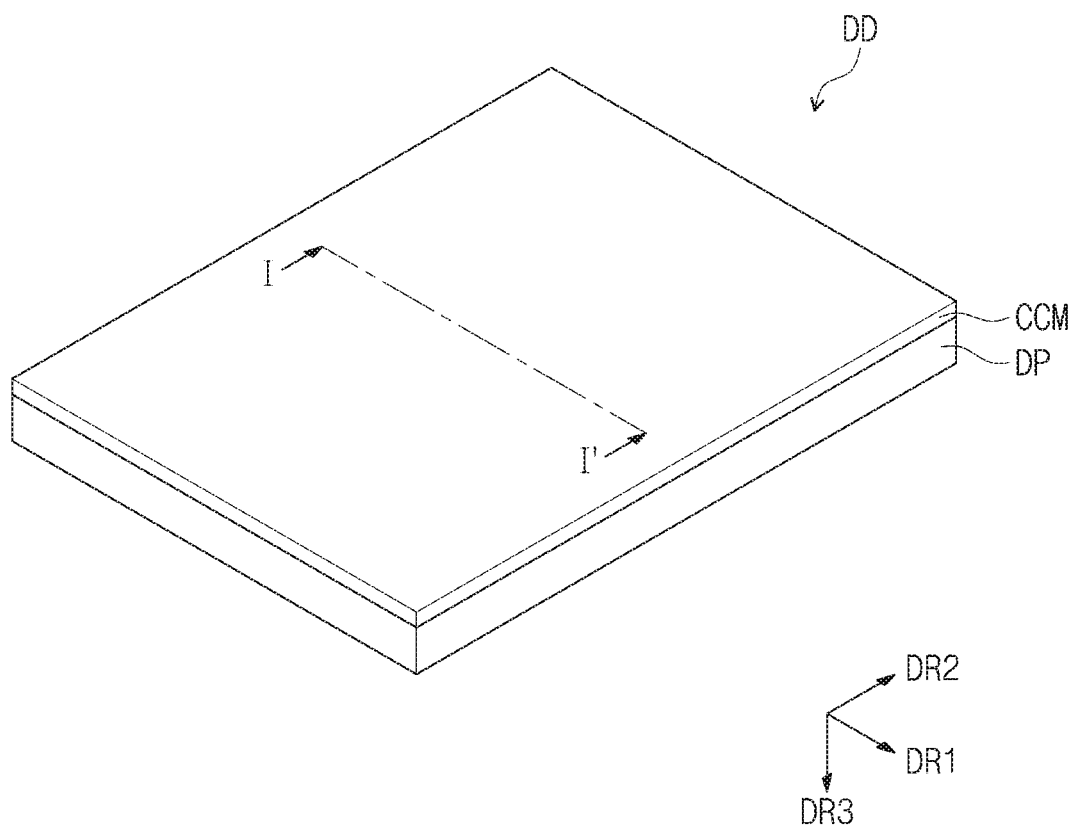
FIG. 1 is a perspective view of a display device according to an embodiment of the inventive concept.

The objects, other objectives, features, and advantages of the inventive concept will be understood without difficulties through preferred embodiments below related to the accompanying drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art.

Like reference numerals refer to like elements throughout. In the drawings, the dimensions and size of each structure are exaggerated, omitted, or schematically illustrated for convenience in description and clarity. It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

The meaning of 'include' or 'comprise' specifies a property, a region, a fixed number, a step, a process, an element and/or a component but does not exclude other properties, regions, fixed numbers, steps, processes, elements and/or components. In the specification, it will be understood that when a layer (or film), a region, or a plate is referred to as being 'on' another layer, region, or plate, it can be directly on the other layer, region, or plate, or intervening layers, regions, or plates may also be present. On the contrary to this, it will be understood that when a layer, a film, a region, or a plate is referred to as being 'under' another layer, region, or plate, it can be directly under the other layer (or film), region, or plate, or intervening layers, regions, or plates may also be present.

Hereinafter, a display device will be described with reference to FIGS. 1 to 12.

Firstly, a display device DD according to an embodiment of the inventive concept will be described with reference to FIG. 1. FIG. 1 is a perspective view of the display device DD according to an embodiment of the inventive concept.

Each component of the display device DD has a top surface that is parallel to a surface defined by a first directional axis DR1 and a second directional axis DR2.

Referring to FIG. 1, a thickness direction of each of the components indicates a third directional axis DR3. Each of the components has an upper side (or upper portion) and a lower side (or lower portion), which are divided along the third directional axis DR3. However, directions indicated by the first to third directional axes DR1, DR2, and DR3 may be relative concepts and converted with respect to each other. Hereinafter, the first to third directions DR1, DR2, and DR3 may be directions indicated by the first to third directional axes DR1, DR2, and DR3 and designated by the same reference numerals, respectively.

In this specification, a term "on a plane" may represent viewing the display device DD in the third direction DR3 (thickness direction).

According to description of embodiments of the inventive concept, although the display device DD has a flat shape, the embodiment of the inventive concept is not limited thereto. In an embodiment, the display device DD may be a curved display device. For example, the display device DD may be a curved display device having an overall recessed or protruding shape (e.g., concave or convex). Also, the display device DD may be a display device in which only a portion is bent.

Also, in an embodiment, the display device DD may be a flexible display device. For example, the display device DD may be a foldable display device or a rollable display device.

The display device DD may include a color conversion layer CCM and a display panel DP. The color conversion layer CCM is disposed on the display panel DP.

Hereinafter, the color conversion layer CCM will be described in detail with reference to FIGS. 2 to 5.

FIGS. 2 to 5 are cross-sectional views taken along line I-I' of FIG. 1. FIGS. 2 to 5 illustrate the color conversion layer CCM in detail.

Figure 2:
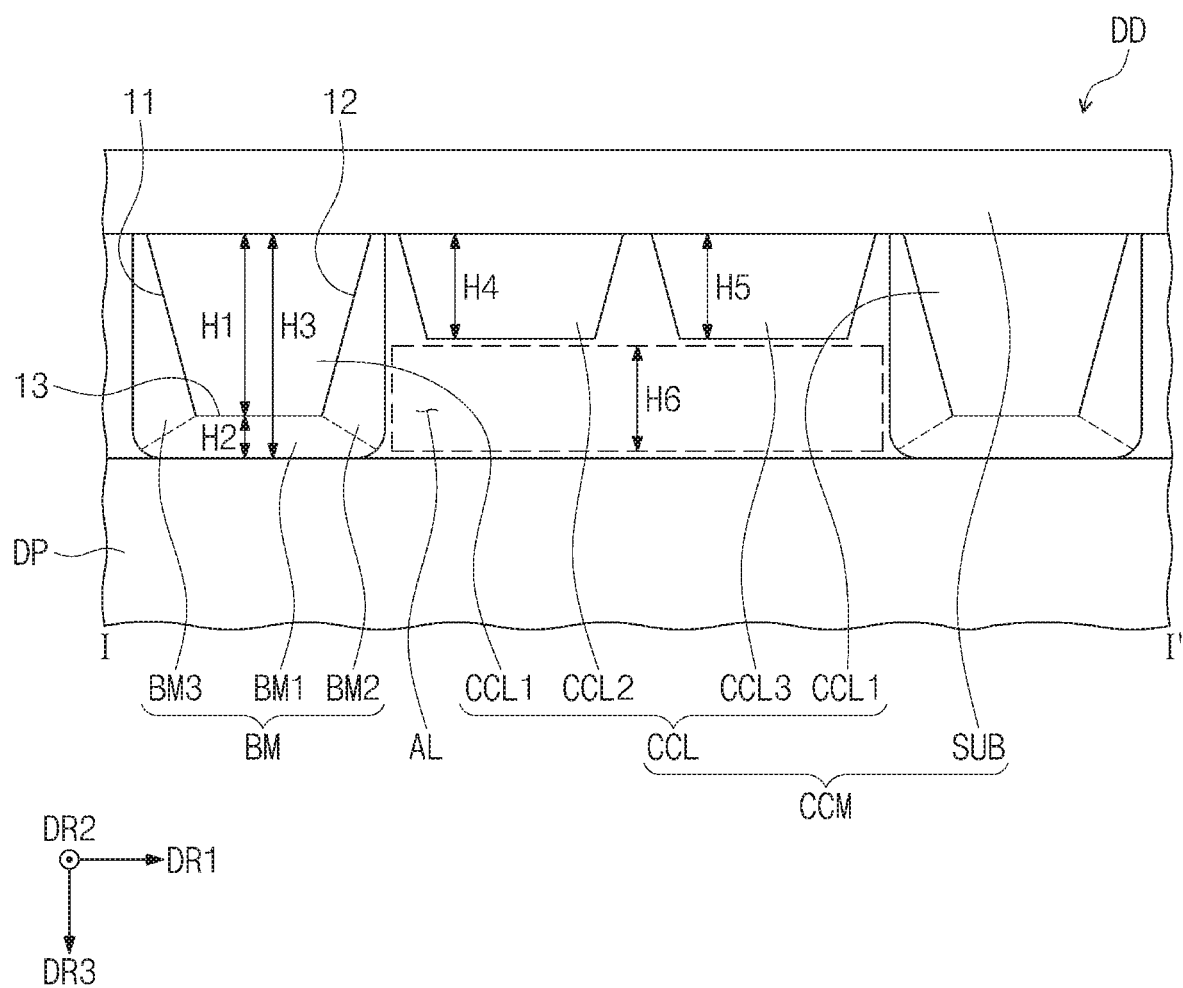
FIG. 2 is a cross-sectional view taken along line I-I' of FIG. 1.

Referring to FIG. 2, the color conversion layer CCM may include a plurality of color conversion parts CCL1, CCL2, and CCL3 and a sub-substrate SUB disposed on a color conversion part CCL.

The color conversion part CCL may include a first conversion part CCL1 transmitting first color light or absorbing the first color light to emit second color light, a second conversion part CCL2 absorbing the first color light to emit third color light, and a third conversion part CCL3 absorbing the first color light to emit fourth color light.

The first color light may have a first blue color having a first central wavelength, and the second color light may have a second blue color having a second central wavelength that is different from the first central wavelength. That is, both of the first color light and the second color light may be blue light having a blue-based wavelength. Although wavelength regions of the first color light and the second color light may partially overlap each other, each of the first color light and the second color light has a different central wavelength that forms a peak in a wavelength region.

For example, the first blue color having a first central wavelength may have a central wavelength of about 440 nm to about 458, and the second blue color having a second central wavelength may have a central wavelength of about 459 nm to about 480, wherein the wavelength regions may partially overlap. Although the first blue color desirably has a wavelength of about 457 nm, the embodiment of the inventive concept is not limited thereto.

One of the third color light and the fourth color light may have a red color, and the other may have a green color. However, the embodiment of the inventive concept is not limited thereto.

Each of the first to third conversion parts CCL1, CCL2, and CCL3 may contain a base resin. The base resin may be a polymer resin. For example, the base resin may include an acrylic-based resin, an urethane-based resin, a silicon-based resin, and an epoxy-based resin. The base resin may be a transparent resin.

Each of the second conversion part CCL2 and the third conversion part CCL3 may contain a luminescent substance. The luminescent substance may be a quantum dot or a fluorescent substance. The luminescent substance may be scattered in a polymer resin.

When the quantum dot is used as the luminescent substance, the quantum dot may be selected from the group consisting of II-VI group compound, III-V group compound, IV group compound, and a combination thereof.

The quantum dot may have a core-shell structure including a core and a shell surrounding the core. Alternatively, the quantum dot may have a core-shell structure in which one quantum dot surrounds another quantum dot. An interface between the core and the shell may have a concentration gradient in which a concentration of an element existed in the shell gradually decreases in a direction toward a center thereof.

The quantum dot may be a particle having a nano-scale size. The quantum dot may have a full width of half maximum (FWHM) of a light emitting wavelength spectrum, which is about 45 nm or less and preferably about 40 nm or less, and more preferably about 30 nm or less, and, in this range, a color purity or a color reproduction property may be enhanced. Also, since light emitted through such a quantum dot is emitted in all directions, a viewing angle of the light may be improved.

Also, although the quantum dot has a shape that is generally used in the corresponding field, the embodiment of the inventive concept is not limited thereto. In more detail, the quantum dot may have a shape such as a globular shape, a pyramid shape, a multi-arm shape, or a shape of a cubic nanoparticle, nanotube, nanowire, and nanofiber, or nanoplate shaped particles.

The color of light emitted by a quantum dot may vary according to a size of a particle. Thus, a quantum dot particle contained in the second conversion part CCL2 and a quantum dot particle contained in the third conversion part CCL3 may be different in size from each other. For example, the quantum dot particle contained in the second conversion part CCL2 may be smaller than the quantum dot particle contained in the third conversion part CCL3. Here, although the quantum dot particle contained in the second conversion part CCL2 may emit light having a shorter wavelength than the quantum dot particle contained in the third conversion part CCL3, the embodiment of the inventive concept is not limited thereto.

Although the fluorescent substance has a shape that is generally used in the corresponding field, the embodiment of the inventive concept is not limited thereto.

The first conversion part CCL1 may or may not include a quantum dot. The first conversion part CCL1 may transmit the first color light that is provided from the display panel DP. That is, the third conversion part CCL3 may be a region emitting the first color light.

The first conversion part CCL1 may further include a blue dye or a blue pigment. Although the blue dye or the blue pigment is a material that is generally used in the corresponding field, the embodiment of the inventive concept is not limited thereto. For example, each of the blue dye and the blue pigment may be an organic pigment, an inorganic pigment, or a mixture of a plurality of different pigments.

The first conversion part CCL1 containing the blue dye or the blue pigment absorbs the first central wavelength region of the first blue color having the first central wavelength and transmits the second central wavelength region. Thus, the first blue color having the first central wavelength may be converted into the second blue color having the second central wavelength while passing through the first conversion part CCL1.

For example, while the first blue color having the first central wavelength of about 440 nm to about 458 nm passes through the first conversion part CCL1, as a wavelength region adjacent to the first central wavelength is absorbed, and a wavelength region adjacent to the second central wavelength is transmitted, the blue color having the second central wavelength of about 459 nm to 480 nm may be emitted.

Each of the first to third conversion parts CCL1, CCL2, and CCL3 may further include scattered particles. The scattered particles may be $TiO_2$ or silica-based nanoparticles. The scattered particles may diffuse light emitted from the luminescent substance to emit the diffused light to the outside of the conversion part. Also, when light provided from the first conversion part CCL1 is directly transmitted, the scattered particles may diffuse the provided light to emit the light to the outside.

The first conversion part CCL1, the second conversion part CCL2, and the third conversion part CCL3 may be sequentially arranged. For example, the color conversion part CCL may include the first conversion part CCL1, the second conversion part CCL2, and the third conversion part CCL3, which are sequentially arranged in a repeated manner. Thus, the second conversion part CCL2 and the third conversion part CCL3 may be disposed between the first conversion parts CCL1. However, the embodiment of the inventive concept is not limited thereto.

The first conversion part CCL1 includes a bottom surface 13, a first side surface 12, and a second side surface 11. The bottom surface 13 may be a surface that faces the display panel DP, is not in contact with the sub-substrate SUB, and is parallel to a surface defined by the first directional axis DR1 and the second directional axis DR2. The first side surface 12 may be a surface connected to the bottom surface 13 and spaced apart from the second side surface 11, and the second side surface 11 may be a surface connected to the bottom surface 13 and spaced apart from the first side surface 12. Although the bottom surface 13, the first side surface 12, and the second side surface 11 are distinguished for convenience, the bottom surface 13, the first side surface 12, and the second side surface 11 may be one integrated structure.

The adhesion member BM may be disposed between the first conversion part CCL1 and the display panel DP to attach the color conversion layer CCM to the display panel DP. In more detail, the adhesion member BM may attach the first conversion part CCL1 to the display panel DP. The adhesion member BM may include a first adhesion part BM1 disposed on the bottom surface 13 of the first conversion part, a second adhesion part BM2 disposed on the first side surface 12 of the first conversion part, and a third adhesion part BM3 disposed on the second side surface 11 of the first conversion part. The first adhesion part BM1, the second adhesion part BM2, and the third adhesion part BM3 may be integrated with each other.

Figure 3:
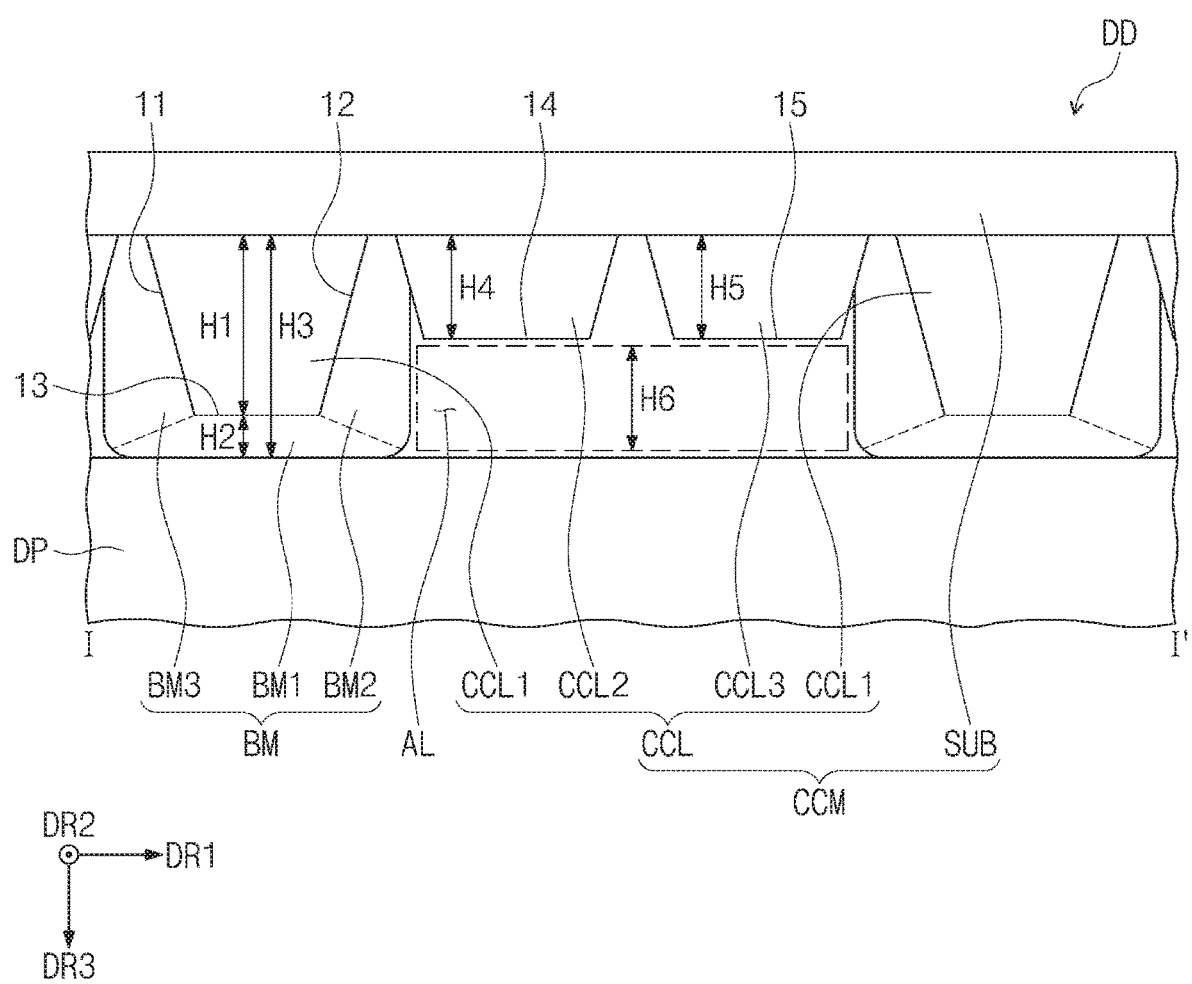
FIG. 3 is a cross-sectional view taken along line I-I' of FIG. 1.

The second adhesion part BM2 or the third adhesion part BM3 of the adhesion member BM may be spaced apart from the second conversion part CCL2 and/or the third conversion part CCL3. However, the embodiment of the inventive concept is not limited thereto. Referring to FIG. 3, the second adhesion part BM2 or the third adhesion part BM3 of the adhesion member BM may be disposed while contacting the side surface of the second conversion part CCL2 or the third conversion part CCL3. In this case, the second adhesion part BM2 may be spaced apart from a bottom surface 14 of the second conversion part CCL2 and a bottom surface 15 of the third conversion part CCL3. Accordingly, the bottom surface 14 of the second conversion part CCL2 and the bottom surface 15 of the third conversion part CCL3 may be exposed to an air layer AL.

The adhesion member BM may contain glutinous or adhesive polymer materials. However, the embodiment of the inventive concept is not limited thereto. For example, the adhesion member BM may contain one selected from the group consisting of a silicon-based polymer, an epoxy-based polymer, an acrylic-based polymer, and a combination thereof, which may be used as an optically clear adhesive (OCA) or an optically clear resin (OCR). However, the embodiment of the inventive concept is not limited thereto. Also, in light of the present disclosure, one may understand how the adhesion member BM may be formed by a method that is generally used in the corresponding field. For example, the adhesion member BM may be formed by an ink-jet printing method.

In this specification, a term "height", which will be described later, may represent a mean height of a corresponding component.

Referring to FIG. 2 again, the first conversion part may have a height H1 greater than each of a height H4 of the second conversion part and a height H5 of the third conversion part. Here, a sum H3 of the height H1 of the first conversion part and the height H2 of the first adhesion part may be greater than each of the height H4 of the second conversion part and the height H5 of the third conversion part.

Figure 4:
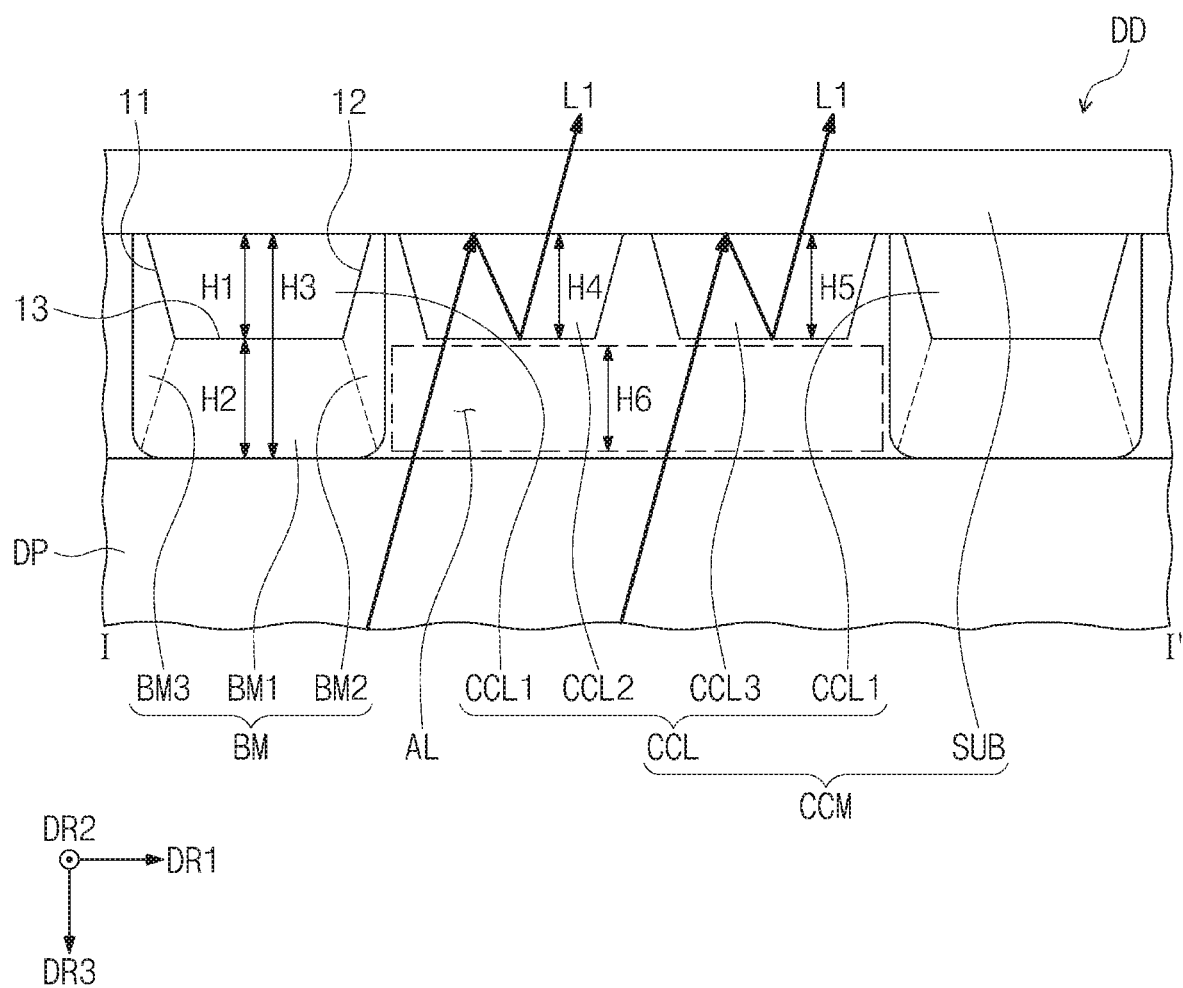
FIG. 4 is a cross-sectional view taken along line I-I' of FIG. 1.

Referring to FIG. 4, the first conversion part may have a height H1 equal to each of a height H4 of the second conversion part and a height H5 of the third conversion part. Here, a sum H3 of the height H1 of the first conversion part and the height H2 of the first adhesion part may be greater than each of the height H4 of the second conversion part and the height H5 of the third conversion part.

Figure 5:
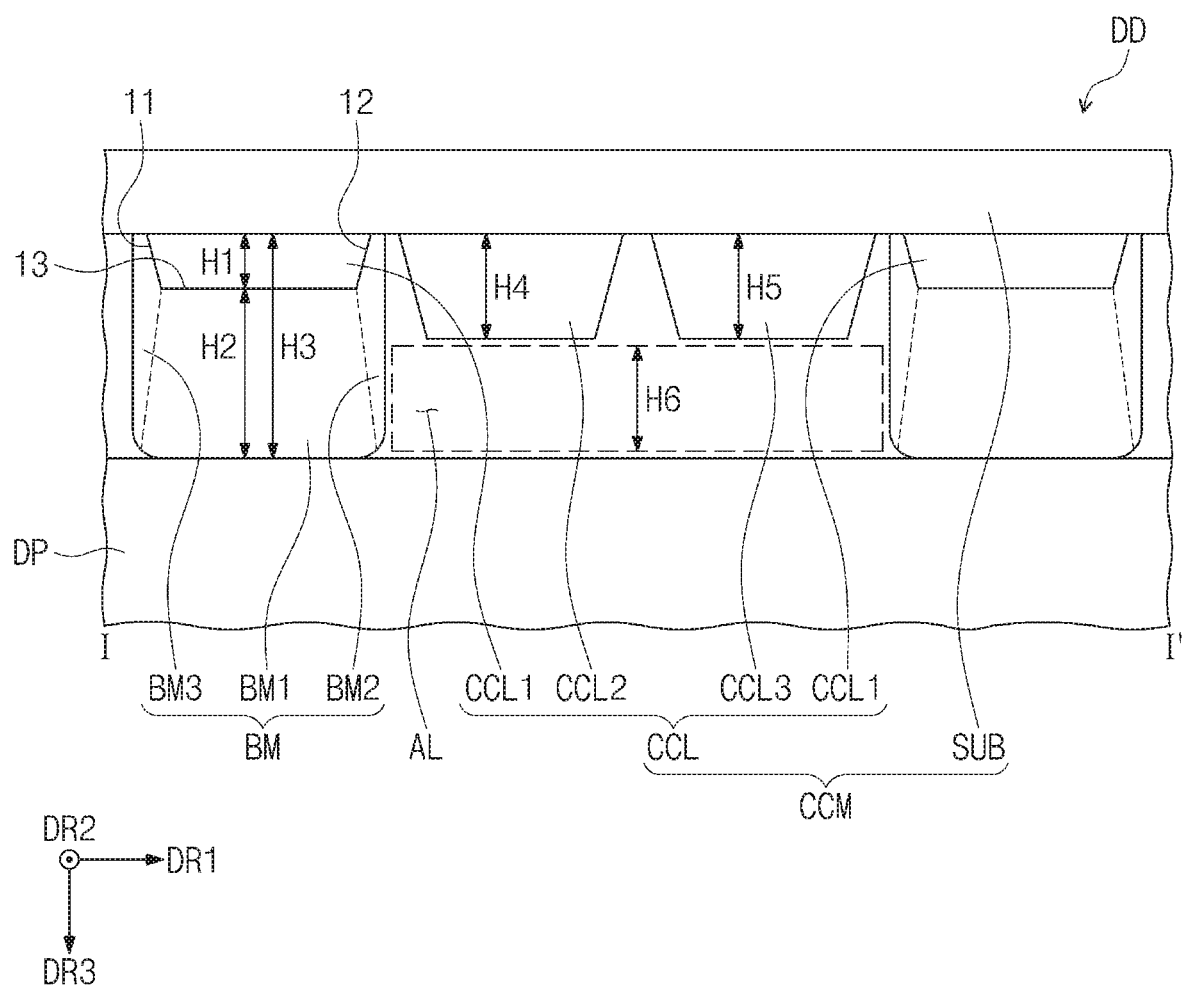
FIG. 5 is a cross-sectional view taken along line I-I' of FIG. 1.

Referring to FIG. 5, the first conversion part may have a height H1 less than each of a height H4 of the second conversion part and a height H5 of the third conversion part. Here, a sum H3 of the height H1 of the first conversion part and the height H2 of the first adhesion part may be greater than each of the height H4 of the second conversion part and the height H5 of the third conversion part.

As described above, since the height H2 of the first adhesion part is adjustable, although the height H1 of the first conversion part may be equal to or less than each of the height H4 of the second conversion part and the height H5 of the third conversion part, the sum H3 of the height H1 of the first conversion part and the height H2 of the first adhesion part may be greater than each of the height H4 of the second conversion part and the height H5 of the third conversion part.

That is, as the adhesion member BM in one embodiment is provided only to the first conversion part CCL1 when the height H1 of the first conversion part is greater than each of the height H4 of the second conversion part and the height H5 of the third conversion part, the display panel DP may be spaced apart from the second conversion part CCL2 and the third conversion part CCL3, and the air layer AL may be defined between the display panel DP and the second and third conversion parts CCL2 and CCL3.

Also, when the height H1 of the first conversion part is less than each of the height H4 of the second conversion part and the height H5 of the third conversion part, the height H2 of the first adhesion part may be adjusted so that the sum H3 of the height H1 of the first conversion part and the height H2 of the first adhesion part is greater than each of the height H4 of the second conversion part and the height H5 of the third conversion part. Accordingly, the display panel DP may be spaced apart from the second conversion part CCL2 and the third conversion part CCL3, and the air layer AL may be defined therebetween.

Like the above-described embodiments, even when the height H1 of the first conversion part is adjusted to be equal to or less than each of the height H4 of the second conversion part and the height H5 of the third conversion part, the air layer AL may be defined by adjusting the height H2 of the first adhesion part, and a height H6 of the air layer may be adjusted.

The air layer may have a height H6 greater than about 0 μm and equal to or less than about 3 μm.

Hereinafter, according to an embodiment of the inventive concept, in which the air layer is defined below the second conversion part CCL2 and the third conversion part CCL3, will be described in detail with reference to FIG. 4.

Typically, a portion of light incident into the sub-substrate SUB from the display panel DP would be reflected by a top surface of the second conversion part CCL2 or the third conversion part CCL3. In this case, a limitation in which light output efficiency decreases, occurs.

As a result, provided was a method of increasing the light output efficiency such that as a low refractive organic layer is provided below the color conversion part CCL, light reflected from the color conversion part CCL to the display panel DP is reflected again by the low refractive organic layer. Since a critical angle increases as a difference between media increases, and light incident at an angle greater than the critical angle is total-reflected according to the Snell's law, a light amount that is total-reflected increases as a difference between refractive indexes increases. However, since the low refractive organic layer has a refractive index of about 1.2, which is not sufficiently low, there was a limitation where the light amount that is total-reflected is small.

Thus, according to an embodiment of the inventive concept, as the air layer AL having a low refractive index (about 1.0) is provided, among light that is reflected in the color conversion part CCL and incident downward, light that is total-reflected and emitted to the outside of the display device DD is increased, and the light output efficiency may increase. Also, since an additional layer is not used, manufacturing costs and the level of difficulty may be reduced.

First light L1, which is incident into the sub-substrate SUB and emitted from the display panel DP, is reflected by the top surface of the second conversion part CCL2 or the third conversion part CCL3, and then re-incident toward the air layer AL. Here, the first light L1 may be total-reflected at a boundary between the air layer AL and the second conversion part CCL2 or the third conversion part CCL3 and re-incident into the sub-substrate SUB, and then emitted to the outside to be seen. Accordingly, since the amount of the first light L1, which passes through the sub-substrate SUB and then is outputted to the outside, may increase, the display device according to an embodiment of the inventive concept may have an enhanced light output efficiency.

Figure 6:
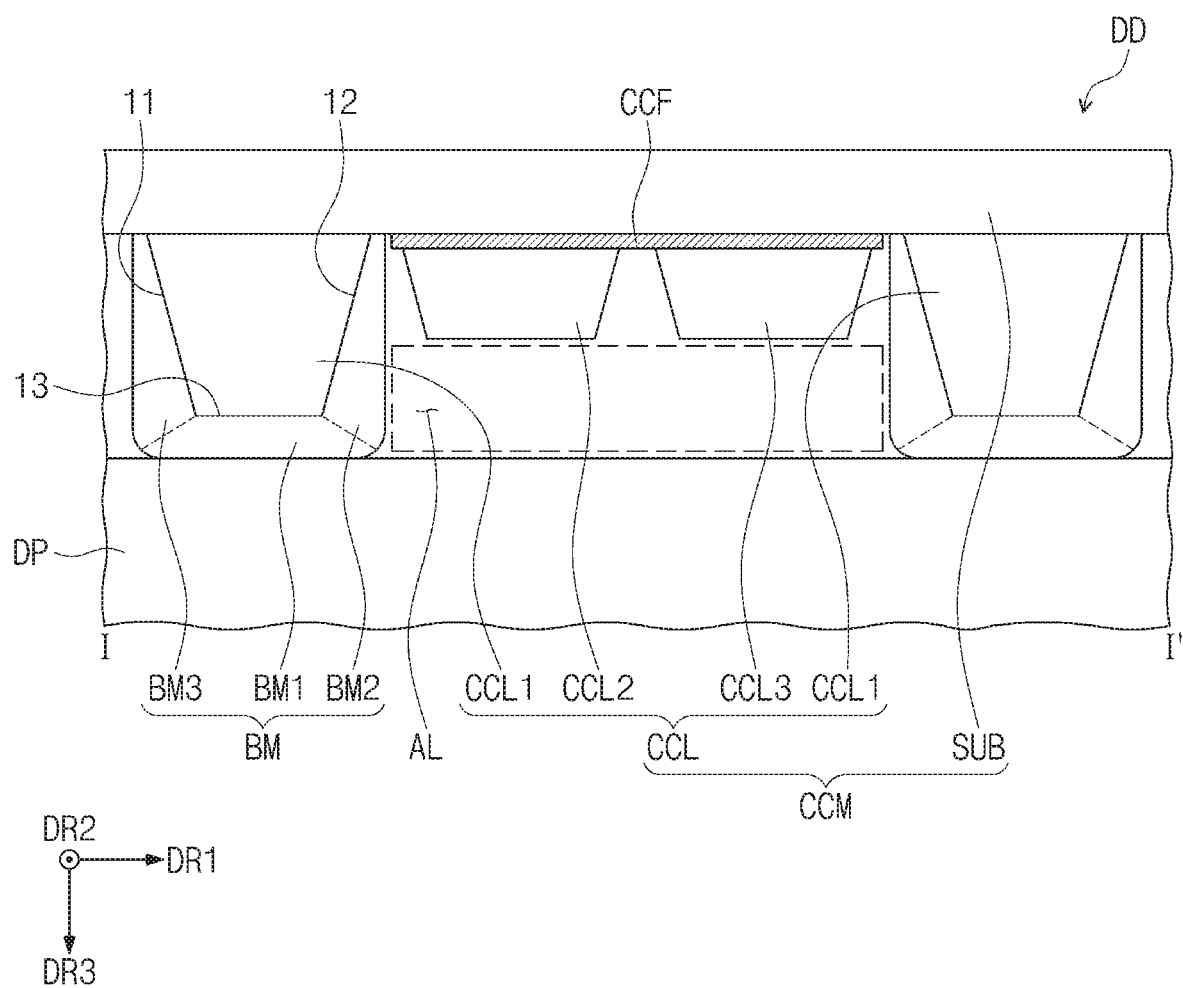
FIG. 6 is a cross-sectional view taken along line I-I' of FIG. 1.
Figure 7:
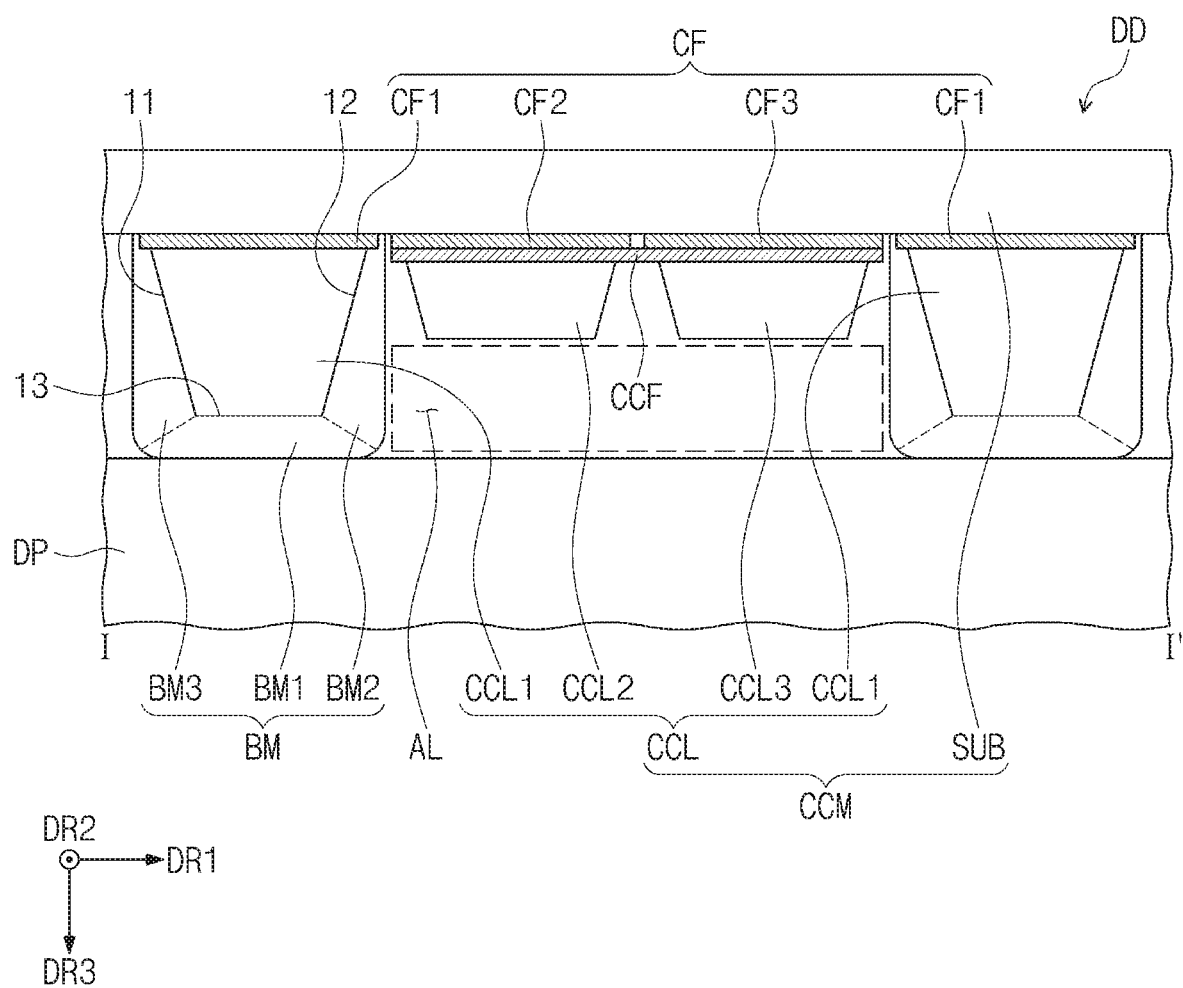
FIG. 7 is a cross-sectional view taken along line I-I' of FIG. 1.

FIGS. 6 and 7 are cross-sectional views taken along line I-I' of FIG. 1, and specifically illustrate a first color blocking filter CCF and a color filter CF, which are disposed on the color conversion layer CCM, respectively. Hereinafter, the first color blocking filter CCF and the color filter CF will be described in detail with reference to FIGS. 6 and 7.

Referring to FIG. 6, the first color blocking filter CCF may be disposed on the second conversion part CCL2 and the third conversion part CCL3. Although not shown, the first color blocking filter CCF may be disposed on only the second conversion part CCL2 or only the third conversion part CCL3. Also, the first color blocking filter CCF may be disposed between the sub-substrate SUB and the second and third conversion parts CCL2 and CCL3.

The first color light emitted from the display panel DP may increase in intensity to improve the light efficiency. In this case, a portion of the first color light may be directly transmitted without being absorbed to the second conversion part CCL2 or the third conversion part CCL3 and emitted to the outside of the sub-substrate SUB. Accordingly, as color mixture may be generated between the color light and the second color light or between the first color light and the third color light, a display quality of an image would otherwise be degraded. However, according to an embodiment in FIG. 6, since the first color light, which passes through the second conversion part CCL2 and CCL3, may be blocked by the first color blocking filter CCF, the color mixture may not be generated, the color reproduction rate may be enhanced, and the display quality of the image may be improved.

Although the first color blocking filter CCF may be a filter having a yellow color, the embodiment of the inventive concept is not limited thereto. For example, the first color blocking filter CCF may include various colors, which do not overlap a wavelength range of the first color.

Referring to FIG. 7, at least one of color filters CF1, CF2, and CF3 may be disposed on the color conversion part CCL. The first color filter CF1 may overlap the first conversion part CCL1 on a plane, the second color filter CF2 may overlap the second conversion part CCL2 on the plane, and the third color filter CF3 may overlap the third conversion part CCL3 on the plane. Although only a structure in which the second color filter CF2 and the third color filter CF3 are disposed on the first color blocking filter CCF is illustrated in FIG. 7, at least one of the color filters CF1, CF2, and CF3 may be disposed on the color conversion parts CCL1, CCL2, and CCL3 even in a structure in which the first color blocking filter CCF is not provided.

Light, which has passed through the color conversion part CCL, may be enhanced in color reproduction rate while passing through the color filter CF, so that the display quality of the image may be improved.

The second color filter CF2 and the third color filter CF3 may be disposed on the first color blocking filter CCF. The second color filter CF2 may transmit only a color having the wavelength of the third color light and absorb colors having other wavelengths among elements of external light, and the third color filter CF3 may transmit only a color having the wavelength of the fourth color light and absorb colors having other wavelengths among elements of external light As a result, as the second color filter CF2 transmits only the third color light, and the third color filter CF3 transmits only the fourth color light, a color of the first color blocking filter CCF may not be seen form the outside, and the display quality of the image may be improved.

Hereinafter, the display panel DP will be described in detail with reference to FIG. 12.

Figure 8:
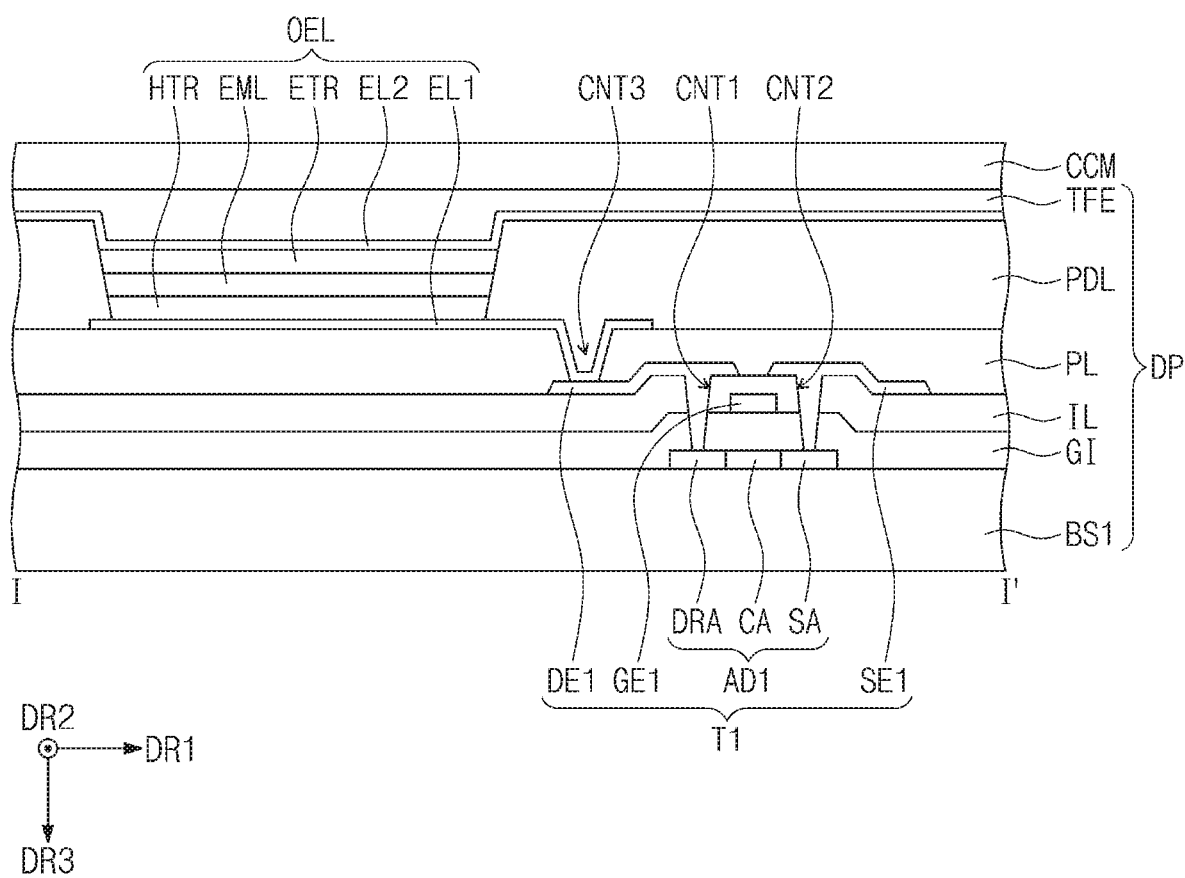
FIG. 8 is a cross-sectional view taken along line I-I' of FIG. 1.
Figure 9:
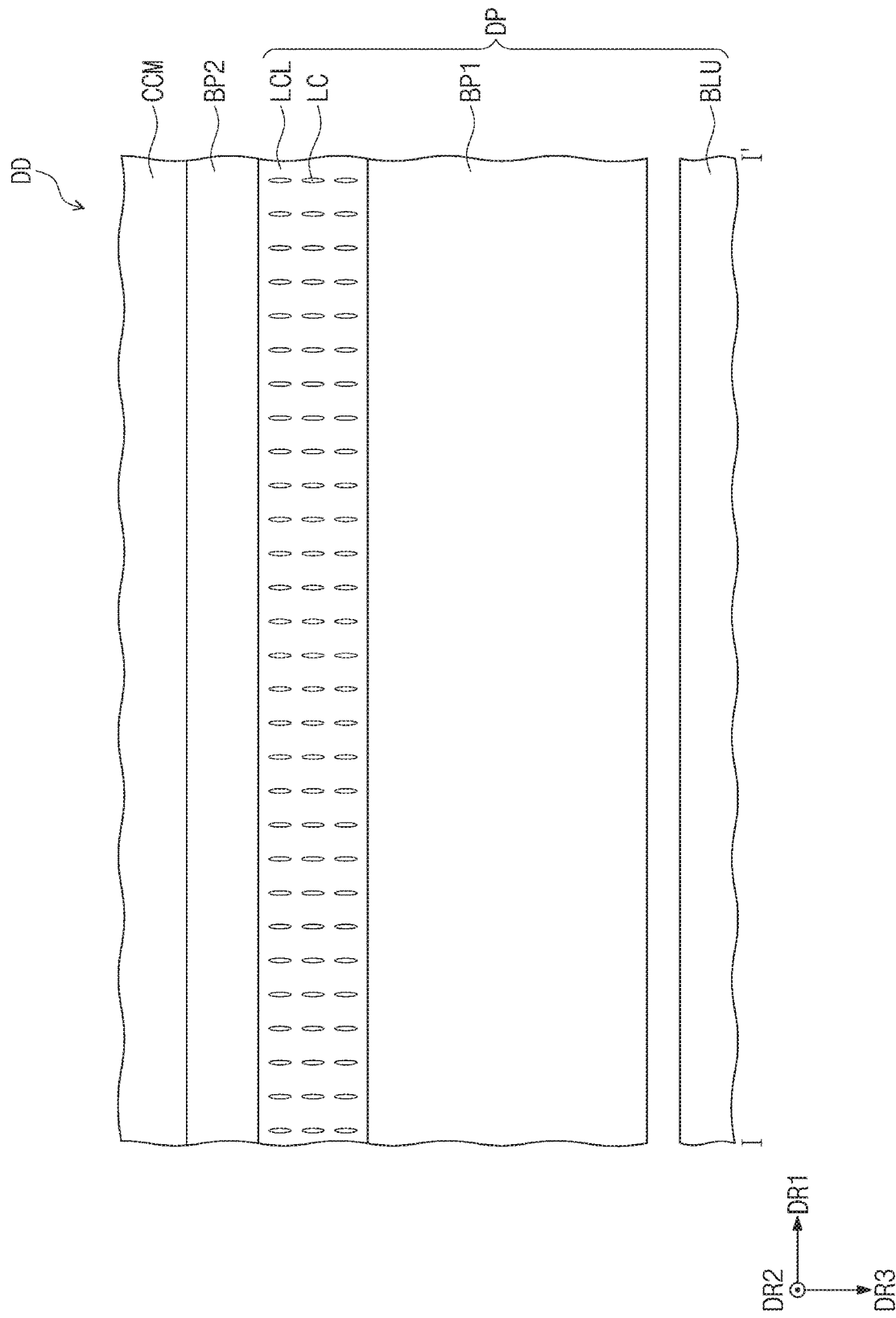
FIG. 9 is a cross-sectional view taken along line I-I' of FIG. 1.

FIGS. 8 and 9 are cross-sectional views taken along line I-I' of FIG. 1. FIG. 8 is a view illustrating an organic light emitting display panel in detail, and FIGS. 9 to 12 are views illustrating a liquid crystal display panel in detail.

Although the organic light emitting display panel and the liquid crystal display panel are illustrated as such in FIGS. 8 and 9, the embodiment of the inventive concept is not limited thereto. For example, one of a plasma display panel, an electrophoretic display panel, a microelectromechanical system (MEMS) display panel, and an electrowetting display panel may be provided.

Referring to FIG. 8, the display panel DP may be an organic light emitting display panel. The organic light emitting display panel DP may include a thin-film transistor T1 and a base substrate BS1 in which organic light emitting elements OEL are laminated. Although a base substrate BS1 may be made of a material that is generally used in the corresponding field, the embodiment of the inventive concept is not limited thereto. For example, the base substrate BS1 may be made of an insulating material such as glass, plastic, and crystal. An organic polymer for forming the base substrate BS1 may include polyethylene terephthalate (PET), polyethylene naphthalate (PEN), polyimide, and polyether sulfone.

The base substrate BS1 may be adequately selected in consideration of mechanical strength, thermal stability, transparency, surface roughness, tractability, waterproofing property, and the like. An active layer AD1 is disposed on the base substrate BS1. The active layer AD1 is made of a semiconductor material and operates as an active layer of the thin-film transistor T1. The active layer AD1 includes a source region SA, a drain region DRA, and a channel region CA disposed therebetween. The active layer AD1 may be made of a material selected from an inorganic semiconductor or an organic semiconductor. The source area SA and the drain area DA may be doped with n-type impurities or p-type impurities.

A gate insulation layer GI is disposed on the active layer AD1. The gate insulation layer GI covers the active layer AD1. The gate insulation layer GI may be made of an organic insulating material or an inorganic insulating material.

A gate electrode GE1 is disposed on the gate insulation layer GI. The gate electrode GE1 covers a region corresponding to the channel region CA of the active layer AD1.

An interlayer insulation layer IL is disposed on the gate electrode GE1. The interlayer insulation layer IL covers the gate electrode GE1. The interlayer insulation layer IL may be made of an organic insulating material or an inorganic insulating material.

A source electrode SE1 and a drain electrode DE1 are disposed on the interlayer insulation layer IL. The drain electrode DE1 contacts the drain region DRA of the active layer AD1 through a first contact hole CNT1 defined in the gate insulation layer GI and the interlayer insulation layer IL, and the source electrode SE1 contacts the source region SA of the active layer AD1 through a second contact hole CNT2 defined in the gate insulation layer GI and the interlayer insulation layer IL.

A passivation layer PL is disposed on the source electrode SE1 and the drain electrode DEL The passivation layer PL may function as a protection layer for protecting the thin-film transistor T1 and also function as a planarization layer for planarizing a top surface of the thin-film transistor T1.

A first electrode EL1 is provided on the passivation layer PL, and a pixel defining layer PDL is provided on the passivation layer PL and the first electrode ELL The pixel defining layer PDL may be divided so as to correspond to each of the pixel regions.

The pixel defining layer PDL may be made of a polymer resin. For example, the pixel defining layer PDL may be made of a polyacrylate-based resin or a polyimide-based resin. Also, the pixel defining layer PDL may be made of an inorganic material in addition to the polymer resin. Alternatively, the pixel defining layer PDL may be made of a light absorption material or made of a black dye or a black pigment. The pixel defining layer PDL containing the black dye or the black pigment may be a black pixel defining layer. Although carbon black may be used as the black dye or the black pigment for forming the pixel defining layer PDL, the embodiment of the inventive concept is not limited thereto.

Also, the pixel defining layer PDL may be made of an inorganic material. For example, the pixel defining layer PDL may be made of silicon nitride (SiNx), silicon oxide (SiOx), silicon oxynitride, or the like.

An organic light emitting element OEL is also disposed on the passivation layer PL. The organic light emitting element OEL includes a first electrode EL1, a hole transport region HTR disposed on the first electrode EL1, a light emitting layer EML disposed on the hole transport region HTR, an electron transport region disposed on the light emitting layer EML, and a second electrode EL2 disposed on the electron transport region ETR.

The first electrode EL1 has conductivity. The first electrode EL1 may be a pixel electrode or a positive electrode. The first electrode EL1 contacts the drain electrode DE1 through a third contact hole CNT3 defined in the passivation layer PL. The first electrode EL1 may be a transmissive electrode, a transflective electrode, or a reflective electrode. When the first electrode EL1 is the transmissive electrode, the first electrode EL1 contain a transparent metal oxide such as an indium tin oxide (ITO), an indium zinc oxide (IZO), a zinc oxide (ZnO), and an indium tin zinc oxide (ITZO). When the first electrode EL1 is the transflective electrode or the reflective electrode, the first electrode EL1 may contain Ag, Mg, Al, Pt, Pd, Au, Ni, Nd, Ir, Cr, Li, Ca, LiF/Ca, LiF/Al, Mo, Ti, or a compound or a mixture (e.g., a mixture of Ag and Mg) thereof. Alternatively, the first electrode EL1 may have a multi-layered structure including a reflective layer, a transflective layer, and a transparent conductive layer made of an indium tin oxide (ITO), an indium zinc oxide (IZO), a zinc oxide (ZnO), an indium tin zinc oxide (ITZO), or the like. Although the first electrode EL1 may have, e.g., a three-layer structure of ITO/Ag/ITO or a three-layer structure of Ag/ITO/Ag, the embodiment of the inventive concept is not limited thereto.

The hole transport region HTR may be disposed on the first electrode ELL The hole transport region HTR may include a single layer made of a single material, a single layer made of a plurality of materials different from each other, or have a multi-layered structure including a plurality of layers made of a plurality of materials different from each other.

The light emitting layer EML may include a single layer made of a single material, a single layer made of a plurality of materials different from each other, or have a multi-layered structure including a plurality of layers made of a plurality of materials different from each other.

The light emitting layer EML may contain a blue, red, or green light emitting material, desirably a blue light emitting material. Also, the light emitting layer EML may contain a host or a dopant.

Although a well-known light emitting material may be used as a material of the light emitting layer EML, the embodiment of the inventive concept is not limited thereto.

As described above, the light emitting layer EML may contain a dopant. For example, the light emitting layer EML may include, as a blue dopant, a fluorescent material containing one selected from the group consisting of spiro-DPVBi, spiro-6P, distyryl-benzene (DSB), distyryl-arylene (DSA), a polyfluorene (PFO)-based polymer, and a poly(p-phenylene vinylene (PPV)-based polymer. Also, the fluorescent material may be selected from metal complex such as (4,6-F2ppy)2Irpic or organometallic complex. The light emitting layer EML containing the blue dopant may emit the first color light having the first central wavelength.

The electron transport region ETR is disposed on the light emitting layer EML. The electron transport region ETR may include a single layer made of a single material, a single layer made of a plurality of materials different from each other, or have a multi-layered structure including a plurality of layers made of a plurality of materials different from each other.

The electron transport region ETR may have a thickness of, e.g., about 100 Å to about 1500 Å.

The second electrode EL2 is disposed on the electron transport region ETR. The second electrode EL2 may be a common electrode or a negative electrode. The second electrode EL2 may be a transmissive electrode, a transflective electrode, or a reflective electrode. When the second electrode EL2 is the transmissive electrode, the second electrode EL2 may be made of a transparent metal oxide such as an indium tin oxide (ITO), an indium zinc oxide (IZO), a zinc oxide (ZnO), an indium tin zinc oxide (ITZO), or the like.

When the second electrode EL2 is the transflective electrode or the reflective electrode, the second electrode EL2 may include Ag, Mg, Al, Pt, Pd, Au, Ni, Nd, Ir, Cr, Li, Ca, LiF/Ca, LiF/Al, Mo, Ti, or a compound or a mixture (e.g., a mixture of Ag and Mg) thereof. Alternatively, the second electrode EL2 may have a multi-layered structure including a reflective layer, a transflective layer, and a transparent conductive layer made of an indium tin oxide (ITO), an indium zinc oxide (IZO), a zinc oxide (ZnO), an indium tin zinc oxide (ITZO), or the like.

When the organic light emitting element OEL has a front light emitting type, the first electrode EL1 may be the reflective electrode, and the second electrode EL2 may be the transmissive electrode or transflective electrode. When the organic light emitting element OEL has a rear light emitting type, the first electrode EL1 may be the transmissive electrode or transflective electrode, and the second electrode EL2 may be the reflective electrode.

Although not shown, the light emitting layer EML may be a common layer disposed over all of a plurality of pixel regions in common. In this case, since an additional mask or chamber for forming the light emitting layer EML is unnecessary, a substrate failure may be prevented such that the yield rate is improved, and economic feasibility of the process may be enhanced.

An encapsulation member may be disposed on the second electrode EL2. The encapsulation member protects the display panel DP from foreign substances such as moisture, oxygen, or dust particles. A thin-film encapsulation layer TFE may be provided as the encapsulation member. The thin-film encapsulation layer TFE directly covers the second electrode EL2. The thin-film encapsulation layer TFE may include at least one inorganic layer. The thin-film encapsulation layer TFE may further include an organic layer or have a structure in which an organic layer and an inorganic layer are alternately laminated. In an embodiment, the inorganic layer may contain an inorganic material such as an aluminum oxide or a silicon nitride, and the organic layer may contain an acrylate-based organic material. The inorganic layer may be formed by a deposition method or the like, and the organic layer may be formed by a deposition method, a coating method, or the like.

Referring to FIG. 9, the display panel according to an embodiment of the inventive concept may be a liquid crystal display panel.

The liquid crystal display panel may include a first substrate BP1, a second substrate BP2, a liquid crystal layer LCL disposed between the first substrate BP1 and the second substrate BP2, and a light emitting unit BLU disposed below the second substrate BP2 while being spaced apart from the second substrate BP2.

Hereinafter, the liquid crystal display panel DP, which is one of embodiments of the inventive concept, will be described in detail with reference to FIGS. 10 and 11.

Figure 10:
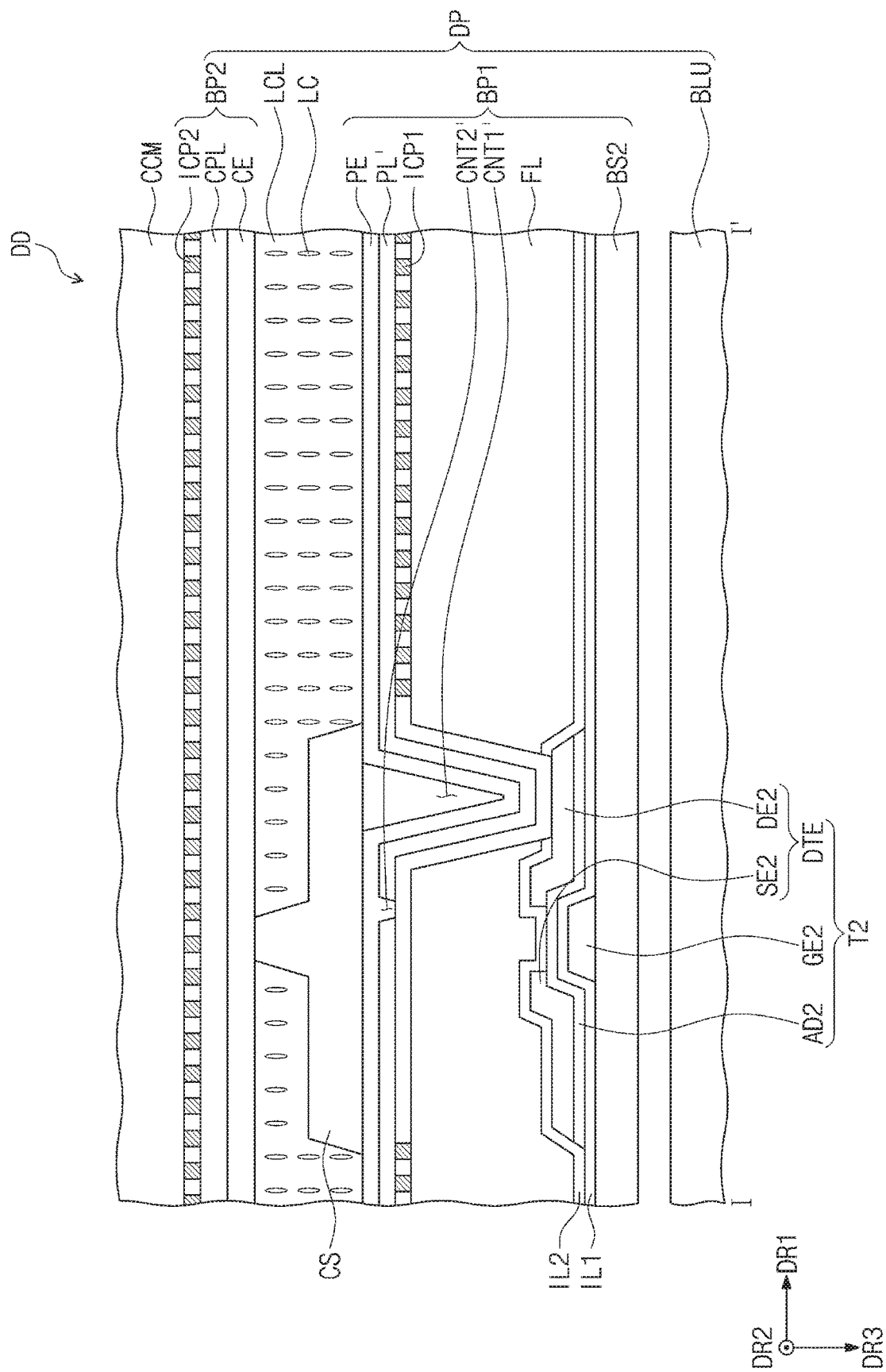
FIG. 10 is a cross-sectional view taken along line I-I' of FIG. 1.

FIG. 10 is a cross-sectional view taken along line I-I' of FIG. 1.

Firstly, referring to FIG. 10, a light source unit BLU may be disposed below a first substrate BP1 and provide first color light to a display panel. The first color light provided from the light source unit BLU may be blue light or ultraviolet light. For example, the light source unit BLU may provide light in a wavelength region equal to or greater than about 350 nm and equal to or less than about 450 nm. Preferably, the first color light may be first blue color having a first central wavelength.

The light source unit BLU may include a plurality of light emitting elements. The light emitting elements may output the first blue color having the first central wavelength. The light source unit BLU may include a plurality of light emitting elements and a circuit substrate providing power to the light emitting elements. The light emitting elements may be disposed on the circuit substrate.

The first substrate BP1 is disposed on the light source unit BLU while being spaced apart form the light source unit BLU. The first substrate BP1 may include a base substrate BS2 on which a thin-film transistor T2 is laminated. A gate electrode GE2 and a first insulation layer IL1 may be disposed on the base substrate BS2.

An active layer AD2 may be disposed on the first insulation layer ILL The active layer AD2 may include an oxide semiconductor or a crystalline semiconductor while overlapping the gate electrode GE2.

A source electrode SE2 and a drain electrode DE2, which constitutes a data electrode DTE, may be disposed on the active layer AD2. At least a portion of each of the drain electrode DE2 and the source electrode SE2 may overlap the active layer AD2. Accordingly, the active layer AD2 may be connected to the data electrode DTE.

A second insulation layer IL2 covering the thin-film transistor T2 may be disposed on the first insulation layer ILL Each of the first insulation layer IL1 and the second insulation layer IL2 may be made of an organic insulating material or an inorganic insulating material.

A planarization layer FL may be disposed on the second insulation layer IL2. As the planarization layer FL may substantially planarize the first substrate BP1, a defect caused by a stepped portion, e.g., disconnection of a signal wire, may be prevented. The planarization layer FL may be an insulation layer containing an organic material.

A first in-cell polarizing layer ICP1 may be provided between the planarization layer FL and a pixel electrode, which will be described later.

The first in-cell polarizing layer ICP1 may be a nano-imprint pattern. For example, the polarizing layer may be a wire grid polarizer (WGP). Although the wire grid polarizing layer may be made of a metal material such as aluminum (Al), copper (Cu), titanium (Ti), or molybdenum (Mo), the embodiment of the inventive concept is not limited thereto.

A passivation layer PL' may be disposed on the first in-cell polarizing layer ICP1. The passivation layer PL' may serve as a protection layer for protecting the thin-film transistor T2.

The pixel electrode PE may be disposed on the passivation layer PL'. The pixel electrode PE may be made of a transparent conductive material. For example, the pixel electrode PE may contain an indium tin oxide (ITO) or an indium zinc oxide (IZO).

When the first in-cell polarizing layer ICP1 is directly disposed on the planarization layer, the first in-cell polarizing layer ICP1 may define a first contact hole CNT1', which passes through the planarization layer FL to partially expose the drain electrode DE2. The pixel electrode PE may define a second contact hole CNT2', which passes through the passivation layer PL' to partially expose the first in-cell polarizing layer ICP1. The pixel electrode PE may contact the first in-cell polarizing layer ICP1 through the second contact hole CNT2', and the first in-cell polarizing layer ICP1 may contact the drain electrode DE2 through the first contact hole CNT1'. Accordingly, the pixel electrode PE may be connected to the drain electrode DE2 through the second contact hole CNT2', the first in-cell polarizing layer ICP1, and the first contact hole CNT1'.

When the pixel electrode is connected to the drain electrode DE2 by directly passing through the passivation layer PL', the first in-cell polarizing layer ICP1, and the planarization layer FL, a defect may be generated in an etching process forming the contact hole due to the complexity of the process. According to an embodiment of the inventive concept, since the first contact hole CNT1' passing through the planarization layer FL and the second contact hole CNT2' passing through the passivation layer PL' are defined, the process may be simplified in complexity in comparison with the process of directly passing through the passivation layer PL', the first in-cell polarizing layer ICP1, and the planarization layer FL.

Figure 11:
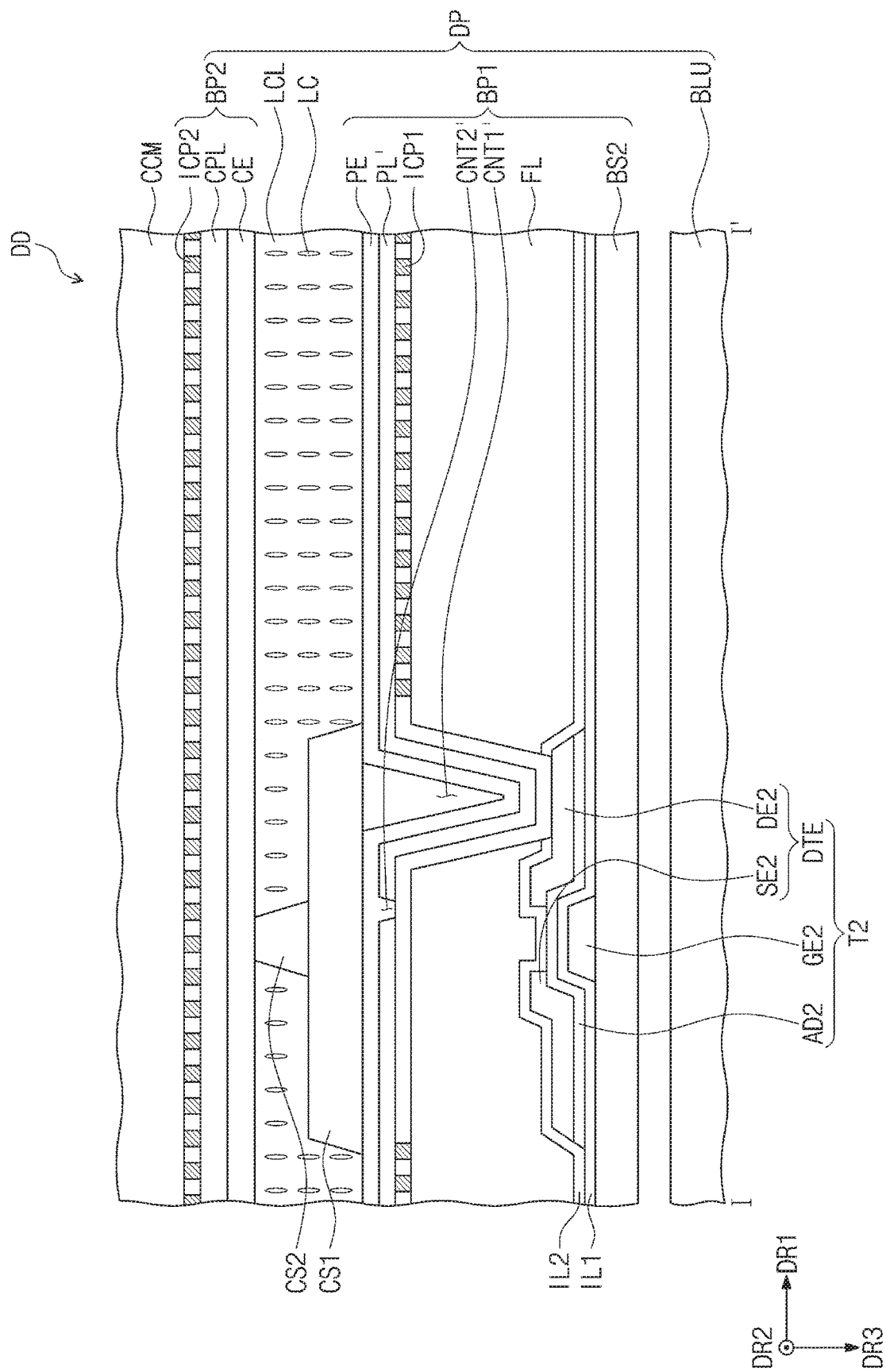
FIG. 11 is a cross-sectional view taken along line I-I' of FIG. 1.

FIG. 11 is a cross-sectional view taken along line I-I' of FIG. 1. Referring to FIG. 11, a column spacer CS for maintaining a cell gap between the second substrate BP2 and the first substrate BP1 may be provided on the pixel electrode PE. The column spacer CS may include a first column spacer CS1 disposed on the pixel electrode and a second column spacer CS2 disposed on the first column spacer CS1. The column spacer CS may overlap the thin-film transistor T2, which is disposed on the base substrate BS2, on a plane. The column spacer CS may be a light shielding column spacer CS. The light shielding column spacer CS may prevent light scattered in the color conversion part CCL from being provided to the thin-film transistor T2. Accordingly, the column spacer CS may prevent burst of the liquid crystal and damage on the substrate as well as damage on the thin-film transistor T2 due to the light.

The first column spacer CS1 may have a width greater than that of the second column spacer CS2, and be disposed so as to overlap the thin-film transistor T2 disposed below the first column spacer CS1 on a plane. The first column spacer CS1 may include the same color element as red light that may be emitted from the second conversion part CCL2 or the third conversion part CCL3. The first column spacer CS1 having the red color element may block the third color light or the fourth color light, which is reflected by the second conversion part CCL2 or the third conversion part CCL3 and transmitted to the thin-film transistor T2, and prevent the first color light reflected by the first in-cell polarizing layer ICP1 from being transmitted to the thin-film transistor T2. The first column spacer CS1 having the red color element may have less residues that are generated after a process in comparison with the light shielding member having an element of a different color, and have excellent light shielding effects with respect to the blue color light.

The second column spacer CS2 may maintain the cell gap of the liquid crystal layer LCL. Although the first column spacer CS1 and the second column spacer CS2 are integrated with each other, the embodiment of the inventive concept is not limited thereto.

The second substrate BP2 is disposed on the liquid crystal layer. The common electrode CE may be disposed below the second substrate. The common electrode CE may contain a transparent conductive material. For example, the common electrode CE may contain an indium tin oxide (ITO) or an indium zinc oxide (IZO).

Liquid crystal LC of the liquid crystal layer LCL is driven by an electric field generated by a potential difference between a data voltage supplied to the pixel electrode PE of the first substrate and a common voltage supplied to the common electrode CE of the second substrate, and accordingly, transmittance of light incident from the light source unit BLU may be adjusted.

A capping layer CPL may be disposed on the common electrode CE. The capping layer CPL may function as a buffer for the common electrode CE to protect the common electrode CE from external environment.

A second in-cell polarizing layer ICP2 may be disposed between the common electrode CE and the color conversion layer CCM. The second in-cell polarizing layer ICP2 may be disposed directly below the color conversion layer CCM. In this case, because of the stepped portion formed on the color conversion part CCL to define the air layer AL, attachment of the second in-cell polarizing layer ICP2 to the color conversion part CCL may be difficult.

Figure 12:
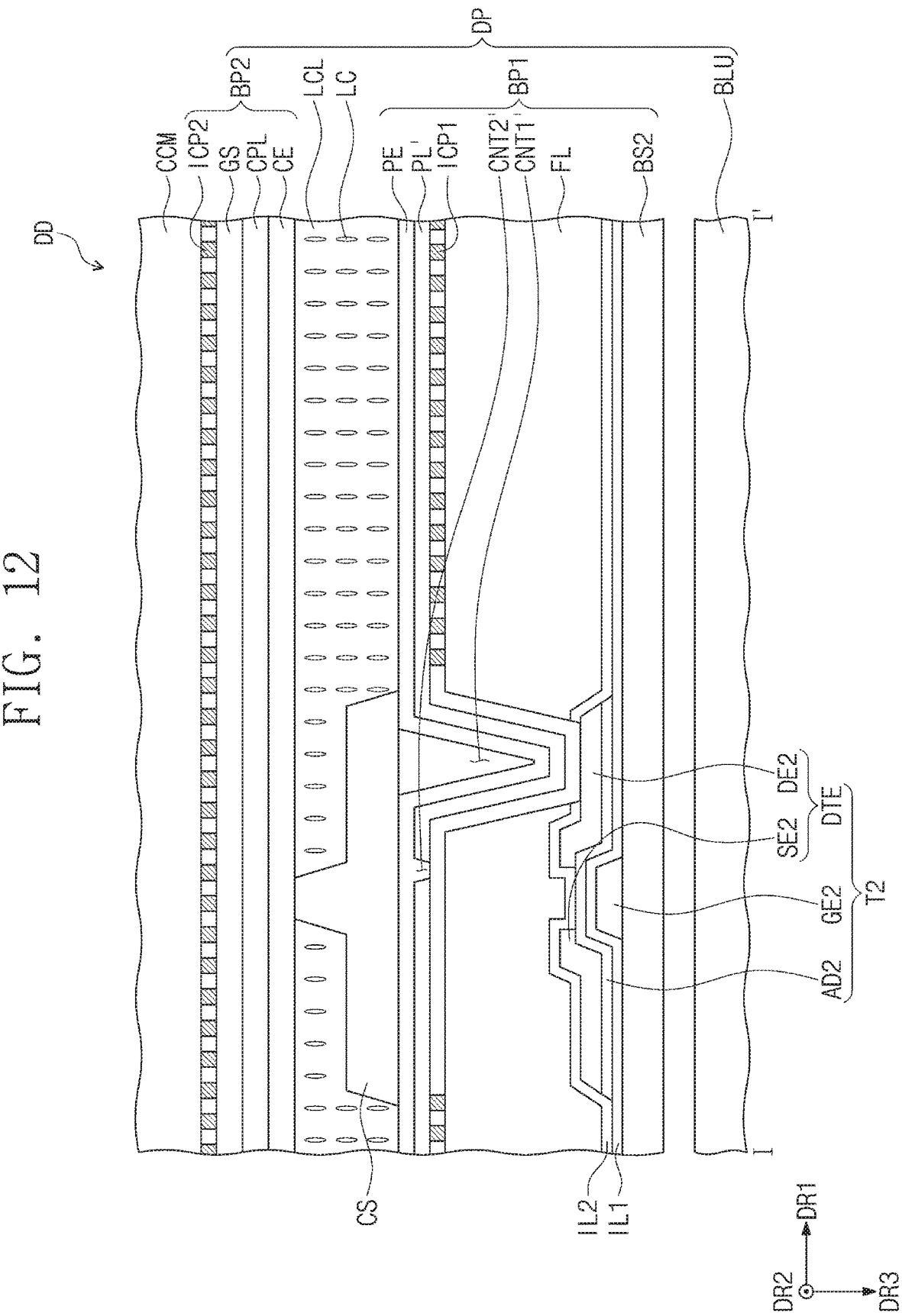
FIG. 12 is a cross-sectional view taken along line I-I' of FIG. 1.

Referring to FIG. 12, when the second in-cell polarizing layer ICP2 is disposed directly below the color conversion part CCM, the second in-cell polarizing layer ICP2 may be disposed on a glass substrate GS, and then disposed directly below the color conversion layer CCM. When the second in-cell polarizing layer ICP2 is disposed on the glass substrate GS and then attached to the color conversion layer CCM, the second in-cell polarizing layer ICP2 may be stably attached although the stepped portion of the color conversion part CCL, and thus the level of difficulty of a process may decrease.

The glass substrate GS may be attached and then removed through an etching process. Although an etching agent may include a chemical substance that is generally used in the corresponding field, the embodiment of the inventive concept is not limited thereto.

In the display device DD according to an embodiment of the inventive concept, as the air layer AL is defined between the display panel DP and the second and third conversion parts CCL2 and CCL3, light that is reflected downward and incident to the display panel is total-reflected, and thus the amount of light emitted to the outside may increase to enhance the light output efficiency.

The display device according to the embodiment of the inventive concept has the excellent light output efficiency and provides the image with high brightness.

The display device according to the embodiment of the inventive concept provides the image having the excellent color purity and the color reproduction rate.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed.

What is claimed is:

1. A display device comprising:
   a display panel;
   a color conversion layer disposed on the display panel; and
   an adhesion member disposed between the display panel and the color conversion layer,
   wherein the color conversion layer comprises a first conversion part configured to one of transmit a first color light and absorb first color light to emit second color light, a second conversion part configured to absorb the first color light to emit third color light, and a third conversion part configured to absorb the first color light to emit fourth color light,
   wherein the first conversion part, the second conversion part, and the third conversion part are sequentially arranged in a first direction in a display region of the display panel,
   wherein the adhesion member is disposed on a bottom surface of the first conversion part,
   wherein an air layer extends between adjacent first conversion parts in the first direction and is defined between the display panel and the second and third conversion parts in a thickness direction of the display panel that is perpendicular to the first direction,
   wherein the adhesion member attaches the color conversion layer and the display panel to each other in a first portion of the display region corresponding to the first conversion part, and
   wherein the air layer separates the color conversion layer and the display panel from each other in a second portion of the display region corresponding to the second and third conversion parts.

2. The display device of claim 1, wherein the adhesion member comprises: a first adhesion part disposed on the bottom surface of the first conversion part; a second adhesion part disposed on a first side surface of the first conversion part; and a third adhesion part disposed on a second side surface of the first conversion part.

3. The display device of claim 2, wherein a sum of a height of the first conversion part and a height of the first adhesion part is greater than each of a height of the second conversion part and a height of the third conversion part.

4. The display device of claim 1, wherein the adhesion member is spaced apart from the second conversion part and the third conversion part on a plane.

5. The display device of claim 1, wherein the adhesion member is spaced apart from a bottom surface of the second conversion part and a bottom surface of the third conversion part, and
the bottom surface of the second conversion part and the bottom surface of the third conversion part are exposed to the air layer.

6. The display device of claim 1, wherein the first conversion part has a height greater than each of a height of the second conversion part and a height of the third conversion part.

7. The display device of claim 1, wherein the first conversion part has a height equal to each of a height of the second conversion part and a height of the third conversion part.

8. The display device of claim 1, wherein the first conversion part has a height less than each of a height of the second conversion part and a height of the third conversion part.

9. The display device of claim 1, wherein the air layer has a height greater than 0 µm and equal to or less than 3 µm.

10. The display device of claim 1, wherein the first color light has a first blue color having a first central wavelength,
the second color light has a second blue color having a second central wavelength that is different from the first central wavelength, and
one of the third color light and the fourth color light has a red color, and the other has a green color.

11. The display device of claim 1, further comprising a first color blocking filter disposed on the color conversion layer,
wherein the first color blocking filter does not overlap the first conversion part and overlaps at least one of the second conversion part and the third conversion part.

12. The display device of claim 1, further comprising at least one of a first color filter, a second color filter, and a third color filter, which are disposed on the color conversion layer,
wherein the first color filter overlaps the first color conversion part on a plane,
the second color filter overlaps the second color conversion part on the plane, and
the third color filter overlaps the third color conversion part on the plane.

13. The display device of claim 1, wherein the display panel comprises:
a first electrode;
a hole transport region disposed on the first electrode;
a light emitting layer disposed on the hole transport region to emit the first color light;
an electron transport region disposed on the light emitting layer; and
a second electrode disposed on the electron transport region.

14. The display device of claim 1, wherein the display panel comprises:
a light source unit configured to provide the first color light;
a first substrate disposed on the light source unit;
a second substrate disposed on the first substrate; and
a liquid crystal layer disposed between the first substrate and the second substrate.

15. The display device of claim 14, wherein the first substrate comprises:
a base substrate;
a transistor disposed on the base substrate;
a planarization layer disposed on the transistor;
a passivation layer disposed on the planarization layer;
a pixel electrode disposed on the passivation layer; and
a first in-cell polarizing layer disposed between the planarization layer and the liquid crystal layer.

16. The display device of claim 15, wherein the first in-cell polarizing layer is disposed between the planarization layer and the passivation layer, and contacts a data electrode through a first contact hole defined in the planarization layer, and
the pixel electrode contacts the first in-cell polarizing layer through a second contact hole defined in the passivation layer.

17. The display device of claim 15, wherein the display panel further comprises a light shielding column spacer disposed on the pixel electrode and overlapping the transistor on a plane.

18. The display device of claim 17, wherein the light shielding column spacer comprises:
a first column spacer disposed on the pixel electrode; and
a second column spacer disposed on the first column spacer,
the first column spacer has a width greater than that of the second column spacer, and
the first column spacer has a red color.

19. The display device of claim 14, wherein the second substrate comprises:
a common electrode; and
a second in-cell polarizing layer disposed on the common electrode.

20. The display device of claim 19, wherein the second in-cell polarizing layer is disposed on a glass substrate, and the glass substrate is disposed on the common electrode.

* * * * *